(12) United States Patent
Yamamoto et al.

(10) Patent No.: US 12,473,047 B2
(45) Date of Patent: Nov. 18, 2025

(54) STRADDLE TYPE VEHICLE

(71) Applicant: KAWASAKI MOTORS, LTD., Akashi (JP)

(72) Inventors: Shigeki Yamamoto, Akashi (JP); Aya Noguchi, Akashi (JP); Chihiro Noda, Akashi (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 590 days.

(21) Appl. No.: 17/896,427

(22) Filed: Aug. 26, 2022

(65) Prior Publication Data

US 2023/0064856 A1 Mar. 2, 2023

(30) Foreign Application Priority Data

Aug. 26, 2021 (JP) .................. 2021-138126

(51) Int. Cl.
*B62J 23/00* (2006.01)
*B62K 11/02* (2006.01)
*F02B 77/02* (2006.01)

(52) U.S. Cl.
CPC .............. *B62J 23/00* (2013.01); *B62K 11/02* (2013.01); *F02B 77/02* (2013.01)

(58) Field of Classification Search
CPC ... B62J 23/00; B62J 11/19; B62J 41/00; B62J 43/30; B62J 45/00; B62J 17/10; B62J 50/30; B62K 11/02; B62K 11/04; B62M 7/04; B60K 11/00; B60R 13/07; B60R 13/0869; B60R 16/0215; F02B 77/02; F02B 77/11; F02B 61/02
See application file for complete search history.

(56) References Cited

U.S. PATENT DOCUMENTS

| | | | | |
|---|---|---|---|---|
| 2,462,489 A * | 2/1949 | Hallett | ................. | H04B 15/025 |
| | | | | 174/395 |
| 6,129,167 A * | 10/2000 | Mabary | ..................... | B62J 23/00 |
| | | | | 237/79 |
| 8,534,740 B2 * | 9/2013 | Yamada | .................... | B62J 17/10 |
| | | | | 296/78.1 |
| 8,783,399 B2 * | 7/2014 | Maeda | ................... | B62K 11/04 |
| | | | | 180/68.1 |
| 9,150,267 B2 * | 10/2015 | Hagimoto | ................ | B62J 35/00 |

(Continued)

FOREIGN PATENT DOCUMENTS

| | | | | |
|---|---|---|---|---|
| CN | 103707964 A | * | 4/2014 | |
| CN | 110015373 A | * | 7/2019 | ............ B60T 8/3685 |

(Continued)

*Primary Examiner* — Steve Clemmons
(74) *Attorney, Agent, or Firm* — PROCOPIO, CORY, HARGREAVES & SAVITCH LLP

(57) ABSTRACT

There is provided a straddle type vehicle including: an engine; a fuel tank configured to store fuel to be supplied to the engine; a power generator driven by the engine; a regulator disposed below the fuel tank and configured to adjust electric power supplied from the power generator to a battery; and a regulator cover that includes a side wall covering the regulator on an outer side in a vehicle width direction and an upper wall covering an upper side of the regulator. The upper wall is formed below a side lower edge of the fuel tank to extend from an inner side to the outer side in the vehicle width direction with respect to the side lower edge.

11 Claims, 9 Drawing Sheets

(56) References Cited

U.S. PATENT DOCUMENTS

| | | | |
|---|---|---|---|
| 9,932,085 B2 * | 4/2018 | Nishida | B62K 11/04 |
| 10,450,026 B2 * | 10/2019 | Nakayama | B62J 17/10 |
| 10,974,784 B2 * | 4/2021 | Bagnariol | B62M 7/02 |
| 11,414,153 B2 * | 8/2022 | Ishii | B62K 19/38 |
| 2009/0050392 A1 | 2/2009 | Kakuta | |
| 2009/0194356 A1 | 8/2009 | Kato et al. | |
| 2018/0272857 A1 * | 9/2018 | Matsushima | B62K 19/28 |
| 2019/0077482 A1 * | 3/2019 | Morotomi | B62J 50/22 |

FOREIGN PATENT DOCUMENTS

| | | | | |
|---|---|---|---|---|
| EP | 3536531 A1 * | 9/2019 | | B60K 11/04 |
| JP | 2009-051323 A | 3/2009 | | |
| JP | 2009-179236 A | 8/2009 | | |
| JP | 2017105253 A * | 6/2017 | | |
| JP | 2019-048553 A | 3/2019 | | |
| JP | 2020-015420 A | 1/2020 | | |
| JP | 2021-041736 A | 3/2021 | | |
| WO | WO-2020022377 A1 * | 1/2020 | | |

* cited by examiner

STRADDLE TYPE VEHICLE

CROSS-REFERENCE TO RELATED APPLICATIONS

This application is based on and claims priority under 35 USC 119 from Japanese Patent Application No. 2021-138126 filed on Aug. 26, 2021, the contents of which are incorporated herein by reference.

TECHNICAL FIELD

The present disclosure relates to a straddle type vehicle including a regulator.

BACKGROUND ART

JP2021-041736A discloses a motorcycle (a straddle type vehicle). The motorcycle includes a power generator driven by an engine and a regulator that adjusts electric power from the power generator. The regulator is disposed inside a vehicle body cover that covers a side of a vehicle body.

When the regulator is disposed inside the vehicle body cover as in JP2021-041736A, water such as rainwater can be prevented from adhering to the regulator. However, depending on a shape of the vehicle body cover, a vehicle body width may increase greatly.

SUMMARY OF INVENTION

The present disclosure provides a straddle type vehicle capable of protecting a regulator from being exposed to water while preventing an increase in a vehicle body width.

According to an illustrative aspect of the present disclosure, a straddle type vehicle includes: an engine; a fuel tank configured to store fuel to be supplied to the engine; a power generator driven by the engine; a regulator disposed below the fuel tank and configured to adjust electric power supplied from the power generator to a battery; and a regulator cover that includes a side wall covering the regulator on an outer side in a vehicle width direction and an upper wall covering an upper side of the regulator. The upper wall is formed below a side lower edge of the fuel tank to extend from an inner side to the outer side in the vehicle width direction with respect to the side lower edge.

According to the straddle type vehicle of the present disclosure, it is possible to protect the regulator from being exposed to water while preventing an increase in the vehicle body width.

DESCRIPTION OF EMBODIMENTS

Overall Configuration of Motorcycle

Figure 1:
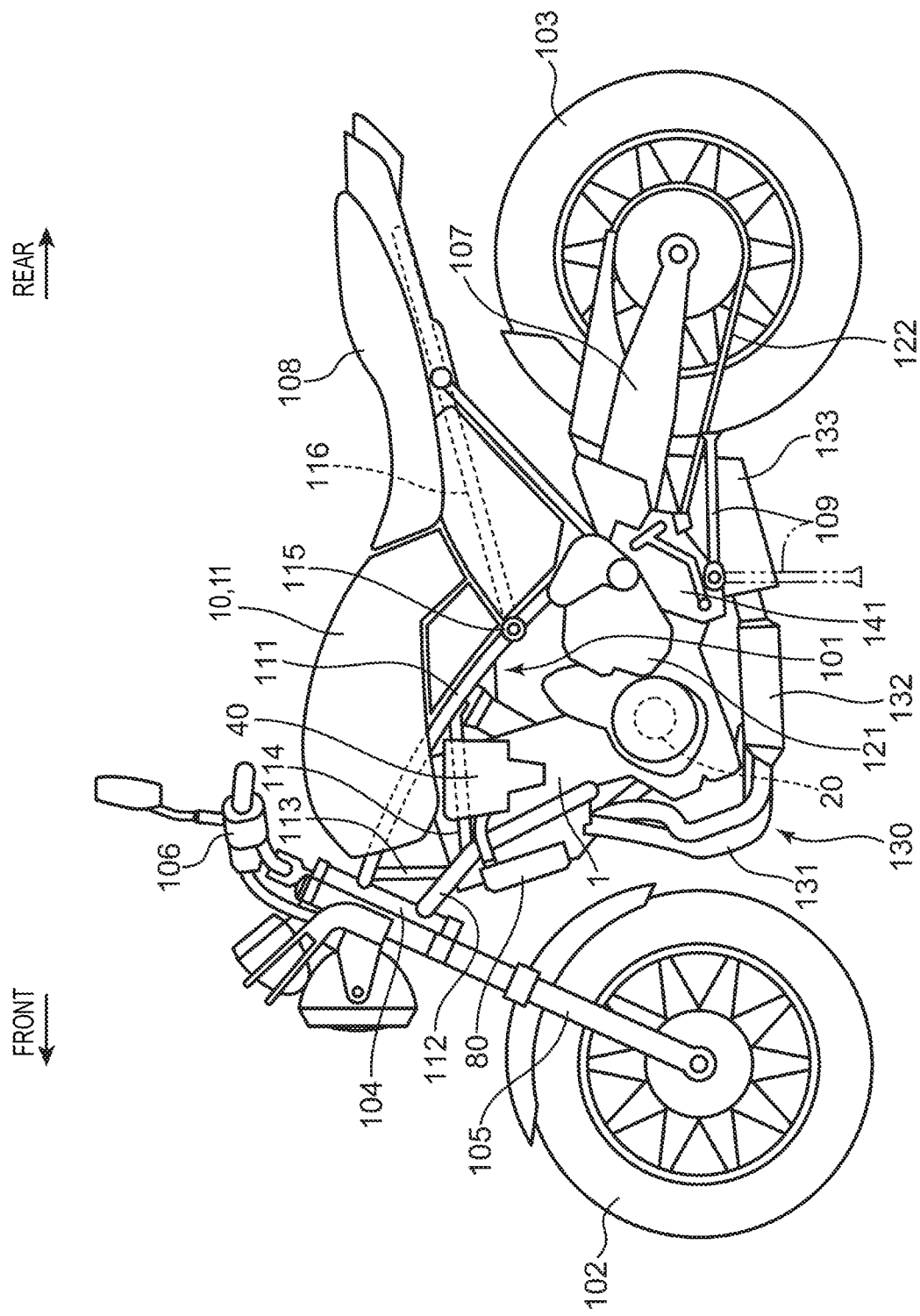
FIG. 1 is a side view showing a motorcycle according to an embodiment of the present disclosure.
Figure 2:
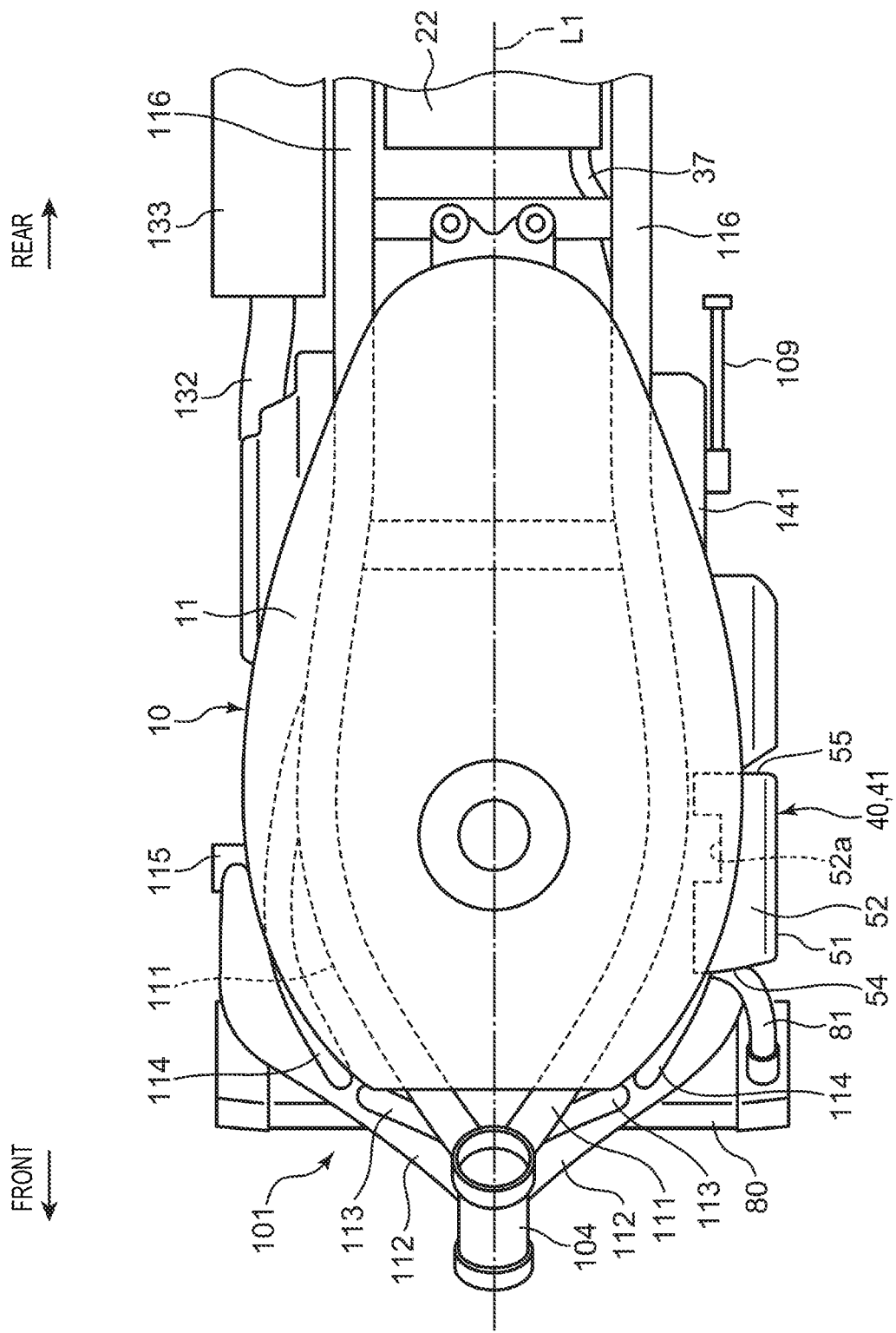
FIG. 2 is a plan view showing a front portion of the motorcycle.
Figure 3:
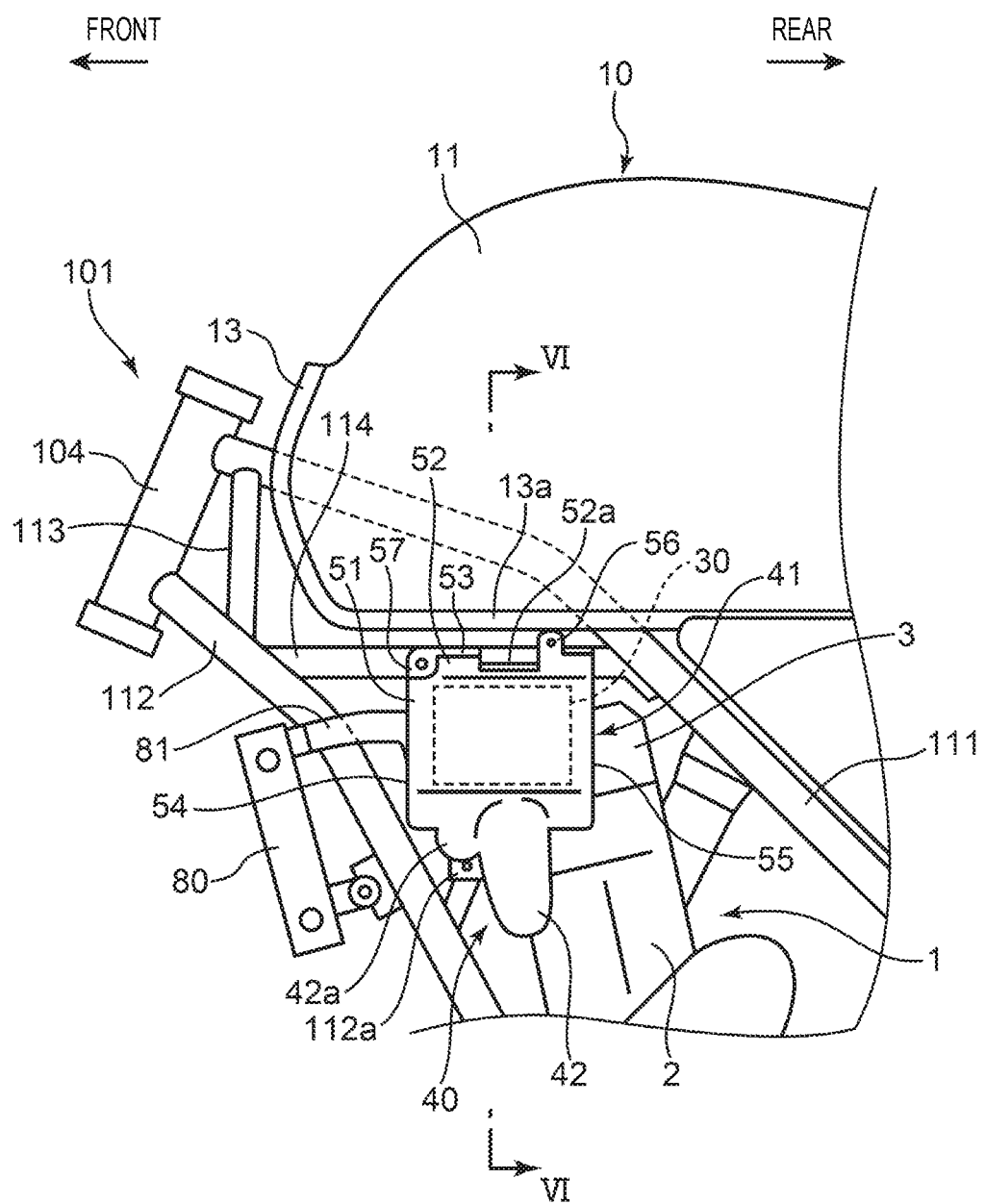
FIG. 3 is a side view showing the front portion of the motorcycle.

FIG. 1 is a side view showing a motorcycle according to an embodiment of the present disclosure, and FIGS. 2 and 3 are a plan view and a side view showing a front portion of the motorcycle. As shown in FIG. 1, the motorcycle includes an engine 1, a fuel tank 10, a power generator 20, a regulator 30 (FIG. 3), a radiator 80, a vehicle body frame 101, a front wheel 102, a rear wheel 103, a head pipe 104, a front fork 105, a handle 106, a swing arm 107, a seat 108, and a side stand 109. That is, the motorcycle is a two-wheeled automobile that travels using a drive force of the engine 1, and is a type of a straddle type vehicle.

The engine 1 is, for example, a four-cycle internal combustion engine. The engine 1 is supported by the vehicle body frame 101 below the fuel tank 10. The engine 1 includes a cylinder block 2 and a cylinder head 3 (FIG. 3) serving as cylinder components including a space (a cylinder) in which fuel supplied from the fuel tank 10 is combusted. A crankshaft which is an output shaft of the engine 1 is rotatably attached to a lower portion of the cylinder block 2. The rotation of the crankshaft is transmitted to the rear wheel 103 via a transmission 121 and a chain 122 (see FIG. 1). That is, the engine 1 is a drive source that rotationally drives the rear wheel 103.

The motorcycle according to the present embodiment is a so-called naked-type motorcycle that is not equipped with a cover (cowl) for covering the periphery of the engine 1. In other words, the engine 1 includes the cylinder block 2 and the cylinder head 3 that are disposed in a state in which the cylinder block 2 and the cylinder head 3 are exposed to outside air.

An exhaust passage 130 through which exhaust gas discharged from the cylinder flows is connected to the engine 1. The exhaust passage 130 includes an exhaust manifold 131 extending downward from a front surface of the engine 1 while being curved, an exhaust pipe 132 that is connected to a downstream end of the exhaust manifold 131 and extends in a front-rear direction, and a muting muffler 133 connected to a downstream end of the exhaust pipe 132. The exhaust pipe 132 and the muffler 133 are disposed at a right side of a vehicle width center. That is, the exhaust pipe 132 and the muffler 133 are disposed in a manner of extending in the front-rear direction at a position at a right side of a vehicle body axis L1 (FIG. 2) which is a center line in a longitudinal direction of the vehicle body.

The power generator 20 is driven by the engine 1 to generate electric power. The power generator 20 is linked to the crankshaft so as to convert a rotation force of the engine 1 into electric power. The electric power generated by the power generator 20 is supplied to a battery 22 (FIG. 2). The battery 22 is a capacitor that stores the electric power supplied from the power generator 20.

The regulator 30 (FIG. 3) is an electric component that adjusts the electric power supplied from the power generator 20 to the battery 22. That is, the regulator 30 outputs the electric power supplied from the power generator 20 to the battery 22 while rectifying the electric power, and regulates a voltage so that an output voltage to the battery 22 does not exceed a predetermined upper limit value. Such electric power adjustment by the regulator 30 is performed to protect the battery 22. The regulator 30 is disposed on a power transmission path from the power generator 20 to the battery 22, and is attached to a left side portion of the vehicle body.

The regulator 30 is covered with a regulator cover 40. The regulator cover 40 is a cover for protecting the regulator 30 from being exposed to water or the like.

The radiator 80 is a heat exchanger that cools cooling water introduced into the engine 1 by heat exchange. A cooling water pipe 81 is disposed between the radiator 80 and the engine 1. The cooling water pipe 81 is a pipe through which cooling water flows between the engine 1 and the radiator 80. The cooling water is circulated between the engine 1 and the radiator 80 through the cooling water pipe 81.

The fuel tank 10 is a tank that stores fuel to be supplied to the engine 1. The fuel tank 10 is supported by the vehicle body frame 101 above the engine 1 and in front of the seat 108. The fuel tank 10 is a joined body of two panels. That is, the fuel tank 10 includes an outer panel 11 and an inner panel 12 (FIG. 6) joined to the outer panel 11 from an inner side. A peripheral edge portion of the outer panel 11 and a peripheral edge portion of the inner panel 12 are joined to each other by welding or the like, so that the fuel tank 10 including a fuel storage space is constructed. In other words, the fuel tank 10 has a flange portion 13 (FIG. 3) which is a joined portion of the outer panel 11 and the inner panel 12 at a peripheral edge of the fuel tank 10.

The vehicle body frame 101 includes a pair of left and right main frames 111, a pair of left and right lower frames 112, a pair of left and right first coupling frames 113, a pair of left and right second coupling frames 114, a cross pipe 115, and a pair of left and right rear frames 116. The pair of main frames 111 are frames that extend rearward and downward from an upper portion of the head pipe 104 while being branched to the left side and the right side. The pair of lower frames 112 are frames that extend rearward and downward from a lower portion of the head pipe 104 while being branched to the left side and the right side. Each of the lower frames 112 is greatly inclined below each of the main frames 111 such that a distance between the lower frame 112 and the main frame 111 increases as the lower frame 112 extends rearward. The pair of first coupling frames 113 are frames that couples front end portions of the pair of main frames 111 and front end portions of the pair of lower frames 112 in an upper-lower direction. The pair of second coupling frames 114 are frames that couples intermediate portions of the pair of main frames 111 and intermediate portions of the pair of lower frames 112 in the front-rear direction. The cross pipe 115 is a pipe that couples rear portions of the pair of main frames 111 in a left-right direction (a vehicle width direction). The pair of rear frames 116 are frames extending rearward and upward from the cross pipe 115.

The head pipe 104 is a pipe member to which the front end portions of the main frames 111 and the front end portions the lower frames 112 are connected in common. The head pipe 104 is disposed in a manner of extending in the upper-lower direction in an inclined posture such that an upper end portion of the head pipe 104 is positioned rearward of a lower end portion of the head pipe 104.

The front fork 105 is rotatably supported by the head pipe 104 via a steering shaft (not shown). The front fork 105 extends in the upper-lower direction while being inclined at the same angle as the head pipe 104. The handle 106 is attached to an upper end portion of the front fork 105, and the front wheel 102 is pivotally supported by a lower end portion of the front fork 105.

The swing arm 107 is an arm that couples the vehicle body frame 101 and the rear wheel 103 and extends in the front-rear direction. A front end portion of the swing arm 107 is pivotally supported by a rear end portion of the main frame 111. The rear wheel 103 is pivotally supported by a rear end portion of the swing arm 107. That is, the swing arm 107 supports the rear wheel 103 in a state in which the swing arm 107 is swingable relative to the main frame 111 in the upper-lower direction.

The seat 108 is a seat on which an occupant (a rider) who drives the motorcycle is seated. The seat 108 is supported on the rear frame 116.

The side stand 109 is a stand used when the motorcycle is parked, and is attached to a left side portion of the vehicle body. A base end portion of the side stand 109 is pivotally supported by a base 141 provided at a lower left portion of the vehicle body. That is, the side stand 109 is displaceable between a non-use state (indicated by a solid line) in which the side stand 109 extends rearward from the base 141 and a use state (indicated by a two-dot chain line) in which the side stand 109 extends downward from the base 141. The side stand 109 displaced to the use state supports the vehicle body in a state in which the vehicle body is inclined to the left side.

[Detailed Structure of Regulator]

Figure 4:
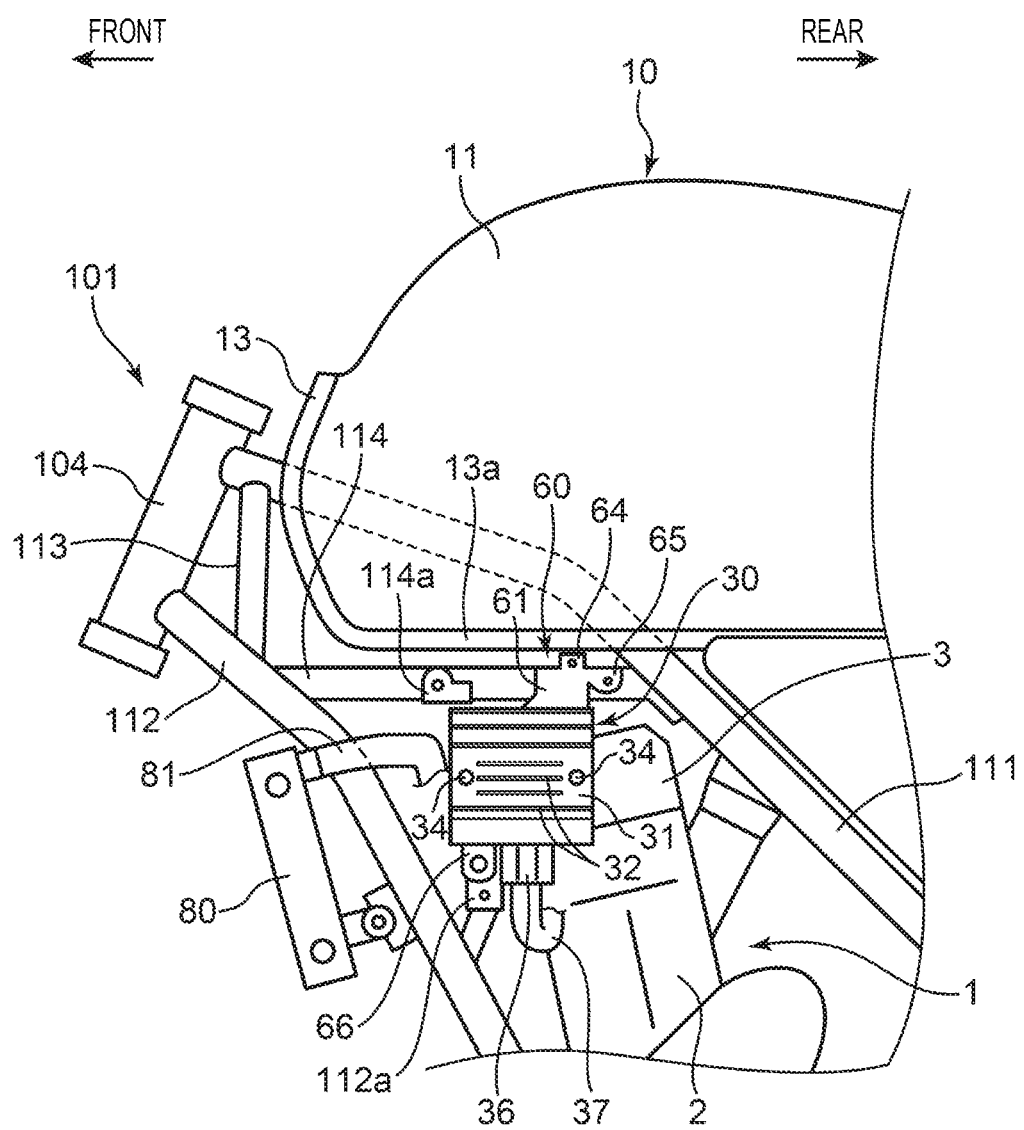
FIG. 4 is a view corresponding to FIG. 3 and showing a vehicle body side portion in a state in which a regulator cover is removed.
Figure 5:
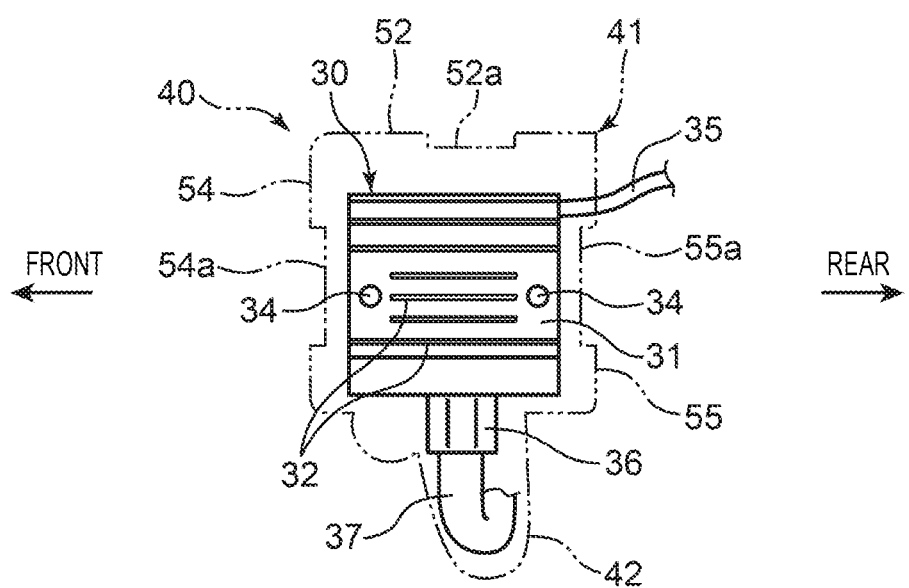
FIG. 5 is a side view schematically showing a positional relationship between a regulator and the regulator cover.
Figure 6:
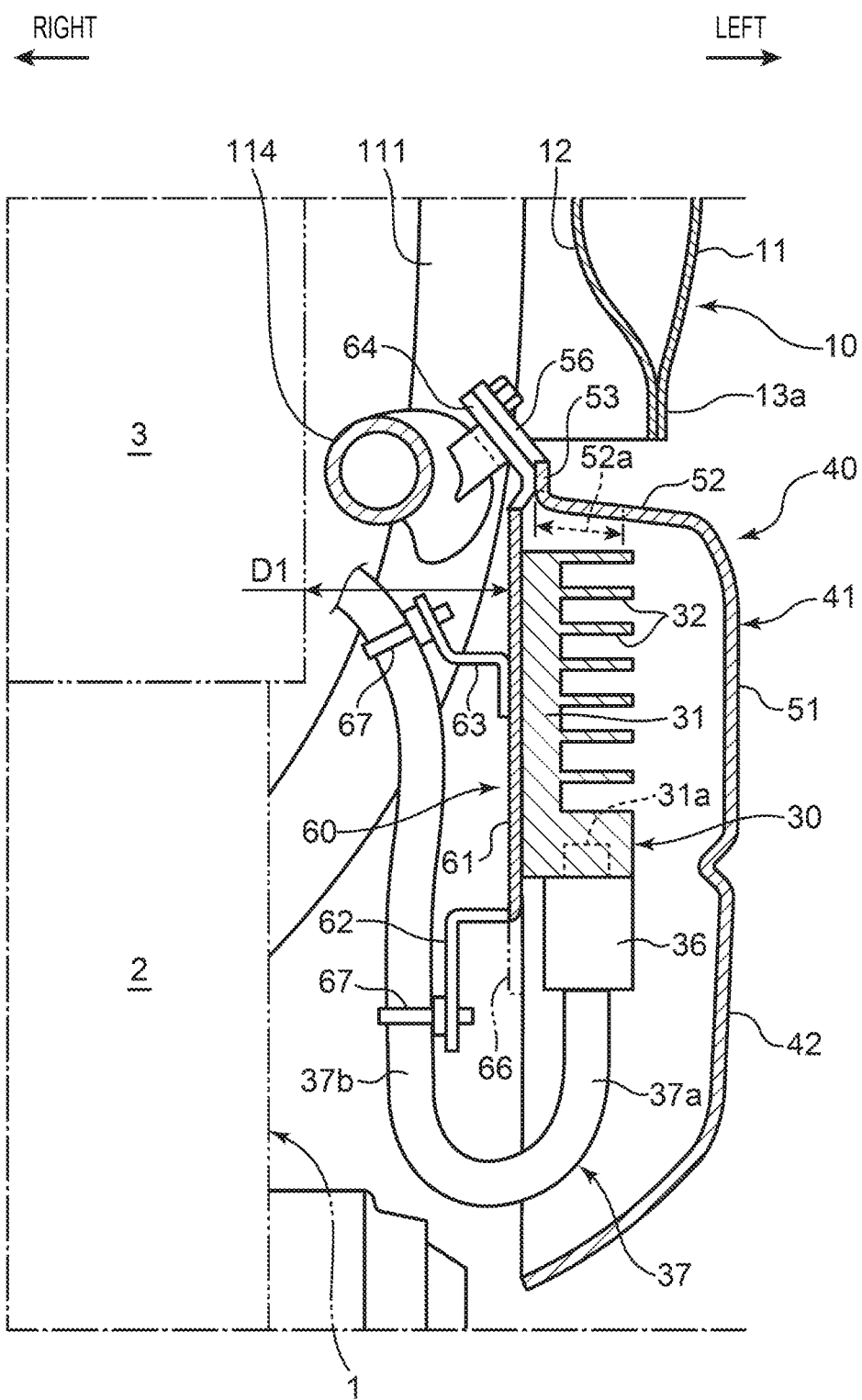
FIG. 6 is a cross-sectional view taken along a line VI-VI in FIG. 3.
Figure 7:
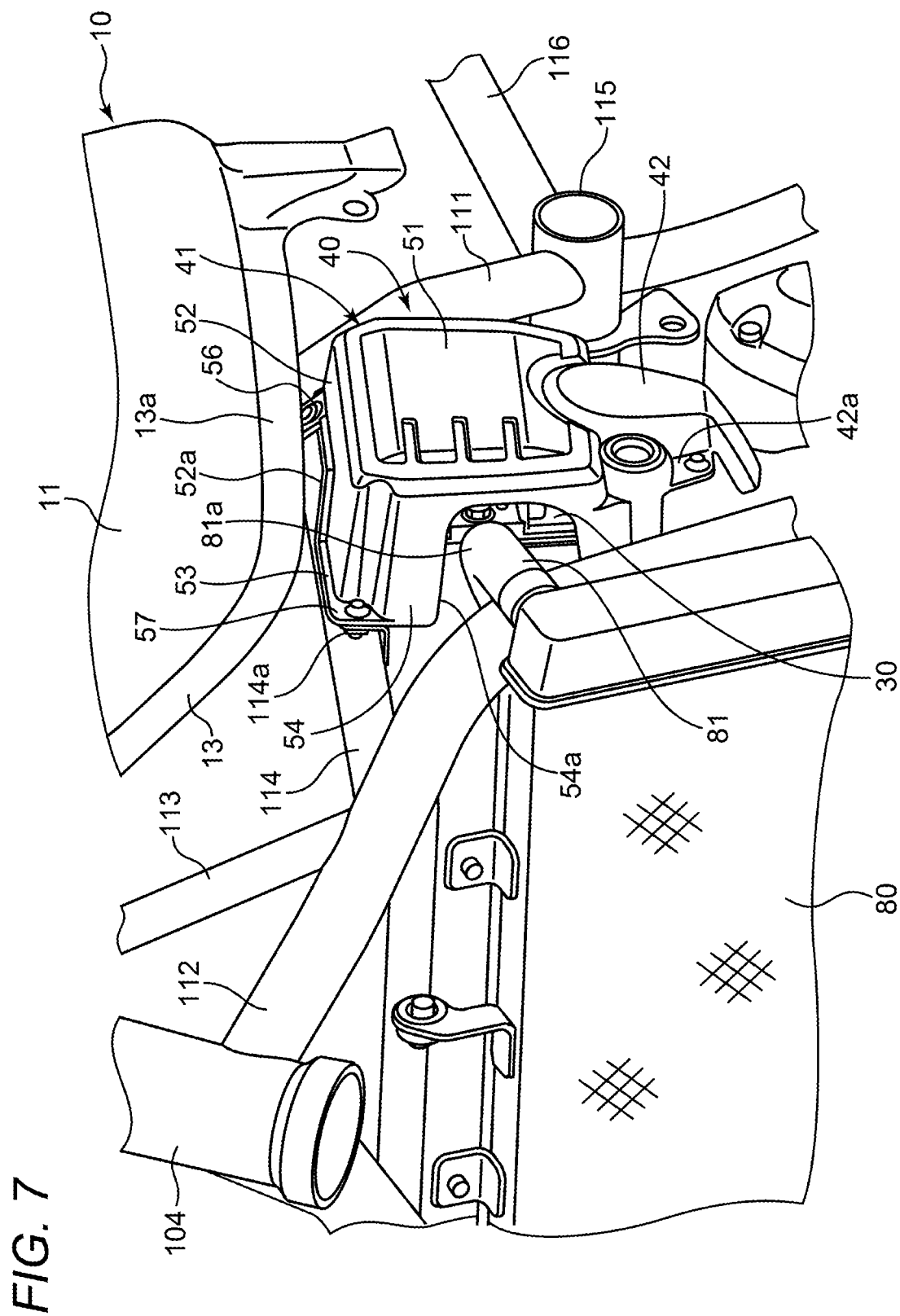
FIG. 7 is a perspective view showing the vehicle body side portion around the regulator cover as viewed obliquely from a front side.
Figure 8:
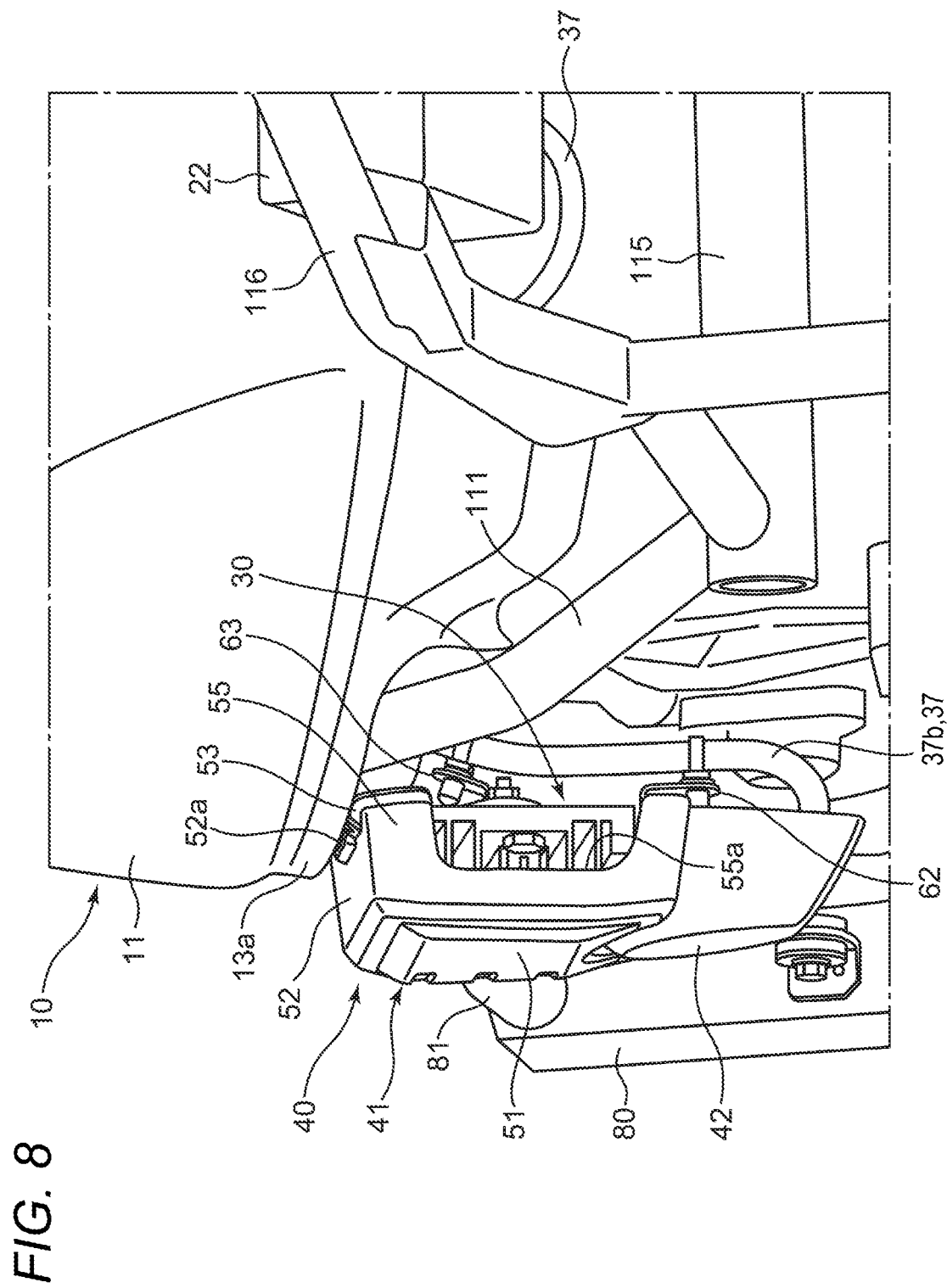
FIG. 8 is a perspective view showing the vehicle body side portion around the regulator cover as viewed obliquely from a rear side.

Next, a more detailed structure of the regulator 30 will be described. FIG. 4 is a view corresponding to FIG. 3 and showing a vehicle body side portion in a state in which the regulator cover 40 is removed. FIG. 5 is a side view schematically showing a positional relationship between the regulator 30 and the regulator cover 40. FIG. 6 is a cross-sectional view taken along a line VI-VI in FIG. 3. FIG. 7 is a perspective view showing the vehicle body side portion around the regulator cover 40 as viewed obliquely from a front side. FIG. 8 is a perspective view showing the vehicle body side portion around the regulator cover 40 as viewed obliquely from a rear side. As shown in these figures, the regulator 30 and the regulator cover 40 are attached to the vehicle body frame 101 via a bracket 60 (FIGS. 4 and 6) below a left side portion of the fuel tank 10.

The bracket 60 is fixed to the vehicle body frame 101 in a state in which the bracket 60 straddles between the left second coupling frame 114 and the left lower frame 112 (see FIG. 4). Specifically, as shown in FIGS. 4 and 6, the bracket 60 includes a bracket main body 61, a first cable support portion 62 and a second cable support portion 63 that support a second power transmission cable 37 to be described later, a cover attachment portion 64 to which the regulator cover 40 is attached, and a first fixing piece 65 and a second fixing piece 66 that are fixed to the vehicle body frame 101. The first cable support portion 62 is a protruding piece that protrudes inward (rightward) and downward in the vehicle width direction from a lower end of the bracket main body 61. The second cable support portion 63 is a joining piece joined to a back surface of the bracket main body 61, and is formed in a manner of protruding inward (rightward) and upward in the vehicle width direction from the back surface. The cover attachment portion 64 is a protruding piece that protrudes upward from an upper end of the bracket main body 61, and is formed in front of the first fixing piece 65. The first fixing piece 65 is a protruding piece that protrudes rearward from the upper end of the bracket main body 61 and is fastened to a rear portion of the left second coupling frame 114. The second fixing piece 66 is a protruding piece that protrudes downward from a lower end of the bracket main body 61 and is fastened to the left lower frame 112. Specifically, the second fixing piece 66 is fastened to a pillar portion 112a extending upward from the left lower frame 112, and is fixed to the lower frame 112 via the pillar portion 112a. That is, the bracket 60 is fixed to the vehicle body frame 101 in a state in which the bracket 60 straddles between the second coupling frame 114 and the lower frame 112 by fastening the first fixing piece 65 to the left second coupling frame 114 and fastening the second fixing piece 66 to the left lower frame 112.

The regulator 30 includes a regulator main body 31 including an electric circuit for performing electric power adjustment, and a plurality of fins 32 that protrude from the regulator main body 31. The regulator main body 31 is a block body formed by molding the electric circuit with resin. Each fin 32 is a protruding piece in a fin shape that protrudes from a surface of the regulator main body 31 at an outer side (a left side) in the vehicle width direction, and is formed in a manner of extending in the front-rear direction in a side view in FIG. 4. The regulator 30 is disposed in a manner of overlapping the bracket main body 61 from an outer side in the vehicle width direction, and is fixed to the bracket 60 via a pair of fastening members 34 fastened to the overlapping portion.

The regulator 30 fixed to the bracket 60 is disposed adjacent to the engine 1 at an outer side (a left side) of the engine 1 in the vehicle width direction. Specifically, the regulator 30 is disposed at a position away from a left side surface of the cylinder head 3 of the engine 1 by a distance D1 (FIG. 6) in the vehicle width direction. The distance D1 is determined in consideration of a thermal influence of the engine 1 on the regulator 30. That is, in order to prevent the thermal influence of the engine 1 from reaching a level at which the thermal influence adversely affects the function of the regulator 30, the regulator 30 is disposed at a position away from the cylinder head 3 by the distance D1 in consideration of the thermal influence.

A first power transmission cable 35 (FIG. 5) extending from the power generator 20 is connected to an upper portion of the regulator main body 31. The first power transmission cable 35 is a cable that supplies the electric power generated by the power generator 20 to the regulator 30.

The second power transmission cable 37 is connected to a lower surface of the regulator main body 31. The second power transmission cable 37 is a cable that supplies the electric power adjusted by the regulator 30 to the battery 22. In other words, the power generator 20 and the battery 22 are electrically connected to each other via the regulator 30, the first power transmission cable 35, and the second power transmission cable 37. The second power transmission cable 37 corresponds to an "electric cable" in the present disclosure.

A connector 36 is attached to an end portion of the second power transmission cable 37 at the regulator 30 side. The connector 36 is attachable to and detachable from a connection port 31a (FIG. 6) provided on a lower surface of the regulator main body 31. That is, the second power transmission cable 37 is detachably connected to a lower surface of the regulator 30 via the connector 36.

As shown in FIG. 6, the second power transmission cable 37 is routed in a manner of being bent in a U shape in a front view. That is, the second power transmission cable 37 includes an outer wiring portion 37a extending downward from the connector 36, and an inner wiring portion 37b that is folded and extends upward from a tip end of the outer wiring portion 37a. The inner wiring portion 37b is routed in a manner of passing through an inner side (a right side) of the bracket 60 in the vehicle width direction. That is, the second power transmission cable 37 is routed in a manner of extending upward along a back surface (a right side surface) of the bracket 60 after going around a lower portion of the bracket 60 from an outer side to an inner side in the vehicle width direction.

The inner wiring portion 37b of the second power transmission cable 37 is fixed to the first cable support portion 62 and the second cable support portion 63 of the bracket 60 via a binding member 67. The inner wiring portion 37b fixed to the cable support portions 62 and 63 is held in a manner of passing through a fixed position in the vehicle width direction between the regulator 30 and the engine 1. As a result, the second power transmission cable 37 can connect the regulator 30 and the battery 22 without coming into contact with a high temperature component such as the engine 1.

The regulator cover 40 is a cover that covers the regulator 30 from the outer side in the vehicle width direction, and integrally includes a cover main body 41 and an extending portion 42. The cover main body 41 is a box-shaped cover body that covers the regulator 30, and is formed into a rectangular shape that is slightly larger than the regulator 30 in a side view shown in FIGS. 3 and 5. The extending portion 42 is a cover body that covers the connector 36 and the second power transmission cable 37, and extends downward from a lower end of the cover main body 41.

The cover main body 41 integrally includes a side wall 51, an upper wall 52, a flange 53, a front wall 54, a rear wall 55, a first fixing portion 56, and a second fixing portion 57. The side wall 51 is a wall portion that has a rectangular shape in a side view and covers an outer side (a left side) of the regulator 30 in the vehicle width direction. The upper wall 52 is a wall portion that covers an upper side of the regulator 30, and is formed in a manner of extending inward (rightward) in the vehicle width direction from an upper end of the side wall 51. The flange 53 is a protruding piece that protrudes upward from an end portion of the upper wall 52 at an inner side in the vehicle width direction. The front wall 54 is a wall portion that covers a front side of the regulator 30, and is formed in a manner of extending inward in the vehicle width direction from a front end of the side wall 51. The rear wall 55 is a wall portion that covers a rear side of the regulator 30, and is formed in a manner of extending inward in the vehicle width direction from a rear end of the side wall 51. The first fixing portion 56 is a fastened portion that is fastened to the cover attachment portion 64 of the bracket 60, and is formed in a manner of protruding upward from an inner edge of a rear portion of the upper wall 52. The second fixing portion 57 is a fastened portion fastened to the left second coupling frame 114, and is formed at a corner portion of an upper end of a front portion of the cover main body 41. Specifically, the second fixing portion 57 is fastened to a pedestal 114a (FIG. 4) joined to an intermediate portion of the left second coupling frame 114 in the front-rear direction, and is fixed to the second coupling frame 114 via the pedestal 114a. That is, the regulator cover 40 is fixed to the bracket 60 and the second coupling frame 114 by fastening the first fixing portion 56 to the cover attachment portion 64 of the bracket 60 and fastening the second fixing portion 57 to the left second coupling frame 114.

In particular, the upper wall 52 is disposed below a side lower edge 13a of the fuel tank 10 as shown in FIG. 6. The side lower edge 13a is a portion constituting a lower end of a left side portion of the fuel tank 10, and is formed of a part of the flange portion 13. The side lower edge 13a and the upper wall 52 are in a positional relationship such that the side lower edge 13a faces an intermediate portion of the upper wall 52 in the vehicle width direction. In other words, the upper wall 52 is formed in a manner of extending from an inner side to an outer side in the vehicle width direction relative to the side lower edge 13a of the fuel tank 10.

The upper wall 52 is inclined such that a height of the upper wall 52 is reduced toward the outer side (the left side) in the vehicle width direction. In other words, the upper wall 52 is formed in a manner of extending outward in the vehicle width direction while being inclined slightly downward from a lower end of the flange 53 toward an upper end of the side wall 51.

As shown in FIGS. 2 and 7, an opening 52a is formed in the upper wall 52. The opening 52a is formed by cutting out a part of the upper wall 52 in a rectangular shape in a plan view from the inner side in the vehicle width direction. In FIG. 6, a range of the opening 52a in the vehicle width direction is indicated by a double-headed arrow of a broken line. As shown in FIG. 6, the opening 52a is formed in a region of the upper wall 52 inward of the side lower edge 13a of the fuel tank 10 in the vehicle width direction. In other words, the side lower edge 13a of the fuel tank 10 faces the upper wall 52 at a position outward of the opening 52a in the vehicle width direction.

As described above, the upper wall 52 is inclined such that the height of the upper wall 52 is reduced toward the outer side in the vehicle width direction. Therefore, a region at the inner side in the vehicle width direction in which the opening 52a is formed is a region in which the height of the upper wall 52 is highest. In other words, the upper wall 52 includes a region (a first portion) at the inner side in the vehicle width direction in which the opening 52a is formed, and a region (a second portion) at the outer side in the vehicle width direction in which the height of the upper wall 52 is lower than the height of the upper wall 52 in the first portion.

The flange 53 is formed along an inner edge of the upper wall 52 including a peripheral edge of the opening 52a. That is, the flange 53 has a portion protruding upward from an end portion of the upper wall 52 at the inner side in the vehicle width direction in the front and rear of the opening 52a, and a portion protruding upward from the peripheral edge of the opening 52a.

As shown in FIG. 7, an opening 54a is formed in the front wall 54. The opening 54a is formed by cutting out a part of the front wall 54 in a rectangular shape as viewed in the front-rear direction from the inner side in the vehicle width direction. The cooling water pipe 81 extending from the radiator 80 is introduced into the opening 54a. That is, the opening 54a capable of receiving the cooling water pipe 81 is formed in the front wall 54 so that the cooling water pipe 81 extending rearward from the radiator 80 does not interfere with the front wall 54 located at a rear side of the radiator 80. Specifically, the cooling water pipe 81 extends rearward from an upper end of a left side portion of the radiator 80 toward the front wall 54, and is disposed in a manner of changing a direction of the cooling water pipe 81 to the inner side in the vehicle width direction through the opening 54a of the front wall 54. In other words, the cooling water pipe 81 has a bent portion 81a that changes the direction of the cooling water pipe 81 through the opening 54a, and the bent portion 81a is disposed in a manner of entering the opening 54a.

As shown in FIG. 8, an opening 55a is formed in the rear wall 55. The opening 55a is formed by cutting out a part of the rear wall 55 in a rectangular shape as viewed in the front-rear direction from the inner side in the vehicle width direction. As schematically shown in FIG. 5, the opening 55a is formed in substantially the same height range as the opening 54a of the front wall 54 described above. In other words, the rear wall 55 has the opening 55a at a position overlapping the opening 54a of the front wall 54 as viewed in the front-rear direction.

The extending portion 42 is formed in a manner of extending downward from an intermediate portion of a lower end portion of the cover main body 41 in the front-rear direction. The extending portion 42 is disposed in a manner of overlapping the connector 36 connected to a lower surface of the regulator 30 in a side view. The extending portion 42 extends further downward than a lower end of the connector 36. Accordingly, the extending portion 42 can cover the second power transmission cable 37 below the connector 36, that is, a portion of the second power transmission cable 37 that extends downward from the connector 36 and is folded upward. That is, the extending portion 42 covers both the connector 36 and the second power transmission cable 37 below the connector 36. In other words, the regulator cover 40 (the cover main body 41 and the extending portion 42) is formed in a manner of covering the regulator 30, the connector 36, and the second power transmission cable 37 from the outer side in the vehicle width direction.

A third fixing portion 42a is formed at a front side of the extending portion 42. The third fixing portion 42a is a fastened portion that is fastened to the pillar portion 112a of the left lower frame 112. The regulator cover 40 is fixed to the lower frame 112 by fastening the third fixing portion 42a to the pillar portion 112a. In other words, the regulator cover 40 is fixed to the vehicle body frame 101 by respectively fastening the fixing portions (the first fixing portion 56, the second fixing portion 57, and the third fixing portion 42a) to the bracket 60, the second coupling frame 114, and the lower frame 112.

[Function and Effect]

As described above, the upper wall 52 of the regulator cover 40 that covers the regulator 30 is formed below the side lower edge 13a of the fuel tank 10 in a manner of extending from the inner side to the outer side of the side lower edge 13a in the vehicle width direction in the present embodiment. According to such a configuration, it is possible to protect the regulator 30 from being exposed to water while preventing an increase in the vehicle body width.

That is, according to the present embodiment in which the side lower edge 13a of the fuel tank 10 and the upper wall 52 of the regulator cover 40 are in the positional relationship as described above, even when water such as rainwater falls downward from the side lower edge 13a of the fuel tank 10, the falling water can be received by the upper wall 52 of the regulator cover 40. For example, when water adheres to a surface of the fuel tank 10 due to traveling in rainy weather or the like, the water may fall downward along the side lower edge 13a of the fuel tank 10. The falling water is received by the upper wall 52 of the regulator cover 40 located below the side lower edge 13a. In addition, since the upper wall 52 extends from the inner side to the outer side in the vehicle width direction relative to the side lower edge 13a, the falling water is accurately received by the upper wall 52, and as a result, the water is prevented from reaching the regulator 30 with a high probability. As described above, since the upper wall 52 of the regulator cover 40 which extends in the vehicle width direction is disposed below the side lower edge 13a of the fuel tank 10 in the present embodiment, water falling from the side lower edge 13*a* can be effectively prevented from adhering to the regulator 30.

Since a portion of the upper wall 52 of the regulator cover 40 is disposed inward of the side lower edge 13*a* of the fuel tank 10 in the vehicle width direction, a protruding amount of the regulator cover 40 in the vehicle width direction from the fuel tank 10 can be reduced to be small, and an increase in the vehicle body width due to the installation of the regulator cover 40 can be prevented. Accordingly, the regulator 30 can be protected from being exposed to water without widening a width of a front portion of the vehicle body including the regulator cover 40.

In the present embodiment, since the opening 52*a* is formed in the upper wall 52 of the regulator cover 40, hot air in the regulator cover 40 can be released to the outside through the opening 52*a*. That is, the hot air generated due to the electric power adjustment by the regulator 30 or the hot air generated from the engine 1 may be accumulated inside the regulator cover 40. In contrast, according to the present embodiment in which the opening 52*a* is formed in the upper wall 52 of the regulator cover 40, the hot air in the regulator cover 40 can be released to the outside, and the regulator 30 can be thermally protected. In addition, since a formation range of the opening 52*a* is limited to a range inward of the side lower edge 13*a* of the fuel tank 10 in the vehicle width direction with, water such as rainwater falling from the side lower edge 13*a* can be prevented from reaching the regulator 30 through the opening 52*a*. That is, according to the present embodiment, it is possible to prevent water from adhering to the regulator 30 while releasing the hot air in the regulator cover 40 to the outside.

Figure 9:
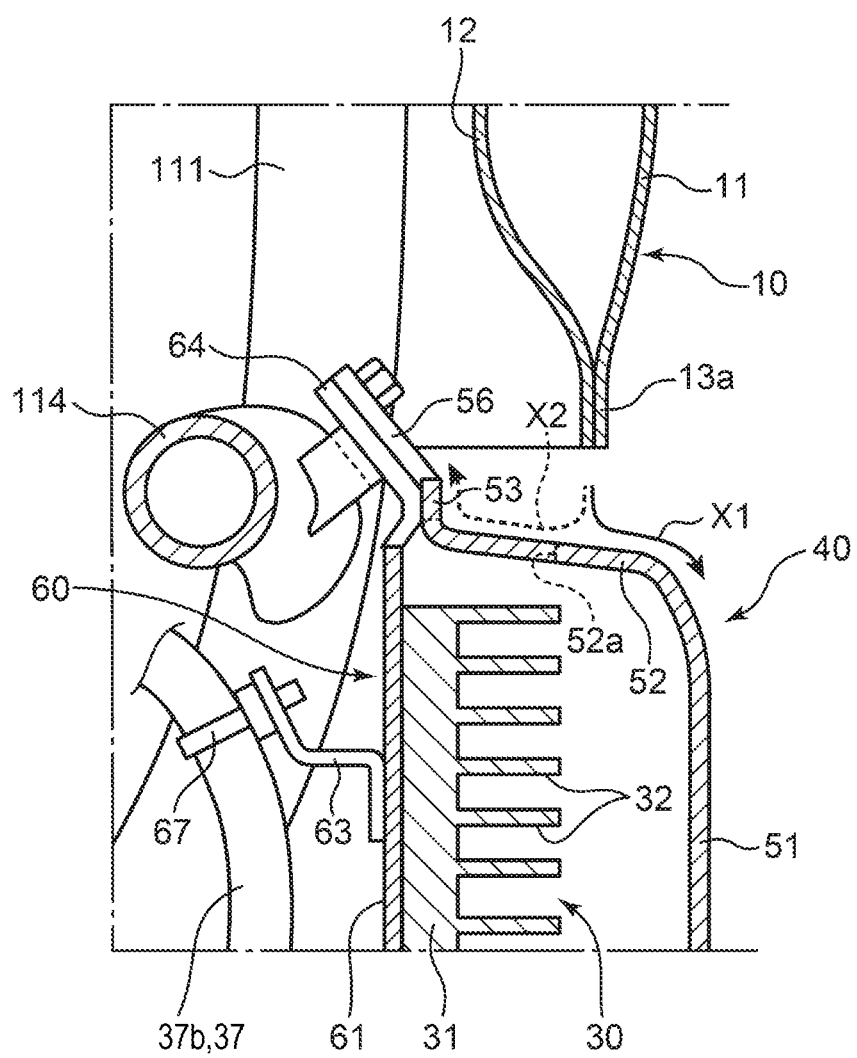
FIG. 9 is a view corresponding to FIG. 6 and showing an effect of the embodiment.

In the present embodiment, since the upper wall 52 of the regulator cover 40 is inclined such that the height of the upper wall 52 is reduced toward the outer side in the vehicle width direction, the water falling from the side lower edge 13*a* of the fuel tank 10 can be further prevented from adhering to the regulator 30. That is, when the water falling from the side lower edge 13*a* is received by the upper wall 52, the water is guided to the outer side in the vehicle width direction by the inclination of the upper wall 52 as indicated by a solid arrow X1 in FIG. 9. The water guided to the outer side moves downward along the side wall 51 and does not adhere to the regulator 30. In other words, in the present embodiment in which the upper wall 52 is inclined, a water flow as indicated by a dashed arrow X2 in FIG. 9, that is, a water flow toward the inner side in the vehicle width direction along the upper wall 52 is less likely to occur. As a result, water can be prevented from flowing around from an inner edge of the upper wall 52 to the inner side of the regulator cover 40, so that water can be further prevented from adhering to the regulator 30.

The fact that the upper wall 52 is inclined as described above refers to that the height of the opening 52*a* in an inner region of the upper wall 52 is relatively high. As a result, hot air in the regulator cover 40 can be efficiently released to the outside through the opening 52*a*.

In the present embodiment, since the flange 53 that protrudes upward from an inner edge of the upper wall 52 (an end portion at the inner side in the vehicle width direction) is provided, the flange 53 can prevent water from flowing around from the inner edge of the upper wall 52 to the inner side of the regulator cover 40, and can further prevent water from adhering to the regulator 30.

In the present embodiment, the second power transmission cable 37 is connected to the connection port 31*a* of the lower surface of the regulator 30 via the connector 36, and both the regulator 30 and the connector 36 are covered by the side wall 51 and the extending portion 42 of the regulator cover 40 from the outer side in the vehicle width direction. According to such a configuration, the effect of preventing the adhesion of water such as rainwater can be achieved not only for the regulator 30 but also for the connector 36.

Since the connector 36 is connected to the lower surface of the regulator 30, water can be further prevented from adhering to the connector 36. That is, in a case where the connector 36 is connected to a portion other than the lower surface of the regulator 30, when water enters the regulator cover 40, the water may adhere to the connector relatively easily. In contrast, according to the present embodiment in which the connector 36 is connected to the lower surface of the regulator 30, since the connector 36 is hidden under the regulator 30 in a top view, water that entered the regulator cover 40 is less likely to adhere to the connector 36. As a result, the connector 36 can be effectively prevented from being exposed to water.

In the present embodiment, the radiator 80 is disposed in front of the front wall 54 of the regulator cover 40, and the cooling water pipe 81 extending rearward from the radiator 80 is introduced into the opening 54*a* of the front wall 54. According to such a configuration, the regulator 30 can be cooled by traveling wind introduced into the regulator cover 40 through the opening 54*a* while avoiding the interference between the cooling water pipe 81 and the front wall 54 by forming the opening 54*a*.

In a case where the opening 54*a* is provided in the front wall 54 as in the present embodiment, it is assumed that rainwater is blown into the regulator cover 40 from the opening 54*a* during traveling in rainy weather. Since the opening 54*a* is formed in a limited range of the front wall 54 and the radiator 80 is present in front of the opening 54*a*, an amount of rainwater blown in from the opening 54*a* is small, and the effect of preventing the regulator 30 from being exposed to water is not greatly impaired. That is, it is possible to cool the regulator 30 by the traveling wind while preventing the regulator 30 from being exposed to water to a minimized extent in the present embodiment.

In the present embodiment, since the opening 55*a* is formed in the rear wall 55 of the regulator cover 40, the traveling wind introduced into the regulator cover 40 from the opening 54*a* of the front wall 54 can be led out from the opening 55*a* of the rear wall 55, and a flow of the traveling wind passing through the regulator cover 40 can be formed. Since the opening 54*a* of the front wall 54 and the opening 55*a* of the rear wall 55 overlap each other as viewed in the front-rear direction, the traveling wind can smoothly flow from the opening 54*a* of the front wall 54 to the opening 55*a* of the rear wall 55, and the regulator 30 can be efficiently cooled by the traveling wind.

In the present embodiment, since the plurality of fins 32 extending in the front-rear direction in a side view are formed in the regulator 30, heat exchange with the traveling wind passing through the regulator cover 40 can be promoted by the fins 32, and cooling efficiency of the regulator 30 can be improved.

Since the motorcycle according to the present embodiment is a naked-type motorcycle in which cylinder components (the cylinder block 2 and the cylinder head 3) of the engine 1 are exposed to the outside air, a flow rate of traveling wind flowing at a side of the cylinder components is likely to be increased. Hot air from the cylinder components is less likely to accumulate in the regulator cover 40, which is advantageous in terms of reducing the temperature of the regulator 30.

In the present embodiment, since the regulator 30 and the regulator cover 40 are attached to the same left side of the vehicle body as the side stand 109, it is possible to effectively preventing the regulator 30 from being exposed to water at the time of parking. That is, when the motorcycle is parked using the side stand 109, the vehicle body is supported by the side stand 109 in a state in which the vehicle body is inclined to the left side. When the vehicle body is inclined to the left side, the inclination of the upper wall 52 of the regulator cover 40 at the left side of the vehicle body becomes steep, and the height of the upper wall 52 at the outer side in the vehicle width direction is significantly reduced relative to the height at the inner side. This refers to that water falling from the side lower edge 13a of the fuel tank 10 to the upper wall 52 is more likely to flow to the outer side in the vehicle width direction, that is, water is less likely to enter the regulator cover 40. That is, according to the present embodiment in which the regulator 30 is attached to the left side of the vehicle body, it is possible to sufficiently prevent water from entering the regulator cover 40 at the time of parking, and it is possible to further prevent water from adhering to the regulator 30.

In the present embodiment, since the exhaust pipe 132 is attached to the right side of the vehicle body axial line L1 (the vehicle body center), the regulator 30 and the exhaust pipe 132 can be disposed in a manner of being separated from each other at opposite sides across the vehicle body axial line L1. The regulator 30 is less likely to be affected by a thermal influence of the exhaust pipe 132 which is likely to increase in temperature, so that it is possible to sufficiently prevent an increase in the temperature of the regulator 30.

[Modification]

Although the upper wall 52 of the regulator cover 40 is formed such that the height of the upper wall 52 is reduced toward the outer side in the vehicle width direction in the embodiment described above, the upper wall may be formed such that the height of the upper wall is reduced in a stepwise manner toward the outer side in the vehicle width direction. In a case where an opening is provided in such a stepped upper wall, the opening is preferably provided in an upper stage portion having a high height.

Although the connector 36 for the second power transmission cable 37 that connects the regulator 30 and the battery 22 is connected to the lower surface of the regulator 30 in the embodiment described above, the connector may be connected to a surface of the regulator other than the lower surface.

Although the regulator 30 and the regulator cover 40 are attached to the left side of the vehicle body in the embodiment described above, the regulator 30 and the regulator cover 40 may be attached to a right side of the vehicle body.

Although an example in which the present disclosure is applied to a motorcycle that is a type of a straddle type vehicle has been described in the embodiment described above, the present disclosure is also applicable to other straddle type vehicles such as a three-wheeled vehicle and a four-wheeled buggy.

SUMMARY

The embodiment described above and the modification of the embodiment are summarized as follows.

A straddle type vehicle includes an engine, a fuel tank that stores fuel to be supplied to the engine, a power generator driven by the engine, a regulator that is disposed below the fuel tank and is configured to adjust electric power to be supplied from the power generator to a battery, and a regulator cover that includes a side wall covering an outer side of the regulator in a vehicle width direction and an upper wall covering an upper side of the regulator. The upper wall is formed below a side lower edge of the fuel tank in a manner of extending from an inner side to an outer side in the vehicle width direction relative to the side lower edge.

In this aspect, when water such as rainwater on a surface of the fuel tank falls downward along the side lower edge, the falling water can be received by the upper wall of the regulator cover. Since the upper wall extends from the inner side to the outer side in the vehicle width direction relative to the side lower edge, the falling water is accurately received by the upper wall, and as a result, the water is prevented from reaching the regulator with a high probability. As described above, since the upper wall of the regulator cover which extends in the vehicle width direction is disposed below the side lower edge of the fuel tank in the present aspect, water falling from the side lower edge can be effectively prevented from adhering to the regulator.

Since a portion of the upper wall of the regulator cover is disposed inward of the side lower edge of the fuel tank in the vehicle width direction, a protruding amount of the regulator cover in the vehicle width direction from the fuel tank can be reduced to be small, and an increase in the vehicle body width due to the installation of the regulator cover can be prevented. As a result, the regulator can be protected from being exposed to water without widening the width of the vehicle body.

It is preferable that the upper wall has an opening in a region inward of the side lower edge of the fuel tank in the vehicle width direction.

In this aspect, hot air in the regulator cover can be released to the outside through the opening of the upper wall. That is, the hot air generated due to the electric power adjustment by the regulator or the hot air generated from the engine may be accumulated inside the regulator cover. In contrast, according to the present aspect in which the opening is formed in the upper wall of the regulator cover, the hot air in the regulator cover can be released to the outside, and the regulator can be thermally protected. In addition, since a formation range of the opening is limited to a range inward of the side lower edge of the fuel tank in the vehicle width direction, water such as rainwater falling from the side lower edge can be prevented from reaching the regulator through the opening. That is, according to the present aspect, it is possible to prevent water from adhering to the regulator while releasing the hot air in the regulator cover to the outside.

It is preferable that the upper wall includes a first portion in which the opening is formed and a second portion having a height lower than a height of the first portion.

According to this aspect, the hot air in the regulator cover can be efficiently released to the outside through the opening located at a relatively high position in the upper wall.

It is preferable that the upper wall is inclined such that the height of the upper wall is reduced toward an outer side in the vehicle width direction.

In this aspect, it is possible to further prevent water falling from the side lower edge of the fuel tank from adhering to the regulator. That is, when the water falling from the side lower edge is received by the upper wall, the water is guided to the outer side in the vehicle width direction by the inclination of the upper wall. As a result, water can be prevented from flowing around from an inner edge of the upper wall to the inner side of the regulator cover, so that water can be further prevented from adhering to the regulator.

It is preferable that the regulator cover includes a flange that protrudes upward from an end portion of the upper wall at an inner side in the vehicle width direction.

In this aspect, the flange can prevent water from flowing around from the end portion of the upper wall at the inner side in the vehicle width direction to the inner side of the regulator cover, and can further prevent water from adhering to the regulator.

The straddle type vehicle may further include an electric cable that connects the regulator and the battery, and a connector that connects the electric cable to a connection port provided in the regulator. In this case, it is preferable that the regulator cover is formed in a manner of covering both the regulator and the connector from the outer side in the vehicle width direction.

In this aspect, the effect of preventing the adhesion of water such as rainwater can be achieved not only for the regulator but also for the connector.

The straddle type vehicle may further include a radiator that cools cooling water introduced into the engine by heat exchange. In this case, it is preferable that the regulator cover has a front wall that covers a front side of the regulator and is located rearward of the radiator, and the front wall has an opening into which a cooling water pipe extending from the radiator is introduced.

In this aspect, the regulator can be cooled by traveling wind introduced into the regulator cover through the opening while avoiding the interference between the cooling water pipe and the front wall by forming the opening.

It is preferable that the regulator cover has a rear wall covering a rear side of the regulator, and the rear wall has an opening at a position overlapping the opening of the front wall as viewed in the front-rear direction.

In this aspect, the traveling wind introduced from the opening of the front wall into the regulator cover can be led out from the opening of the rear wall, and a flow of the traveling wind passing through the regulator cover can be formed. Since the opening of the front wall and the opening of the rear wall overlap each other as viewed in the front-rear direction, the traveling wind can smoothly flow from the opening of the front wall to the opening of the rear wall, and the regulator can be efficiently cooled by the traveling wind.

It is preferable that the engine includes a cylinder component disposed in a state in which the cylinder component is exposed to outside air.

In a straddle type vehicle of a so-called naked-type in which the cylinder component of the engine is exposed to the outside air, an air volume of traveling wind flowing at a side of the cylinder component is likely to be increased. Hot air from the cylinder component is less likely to accumulate in the regulator cover, which is advantageous in terms of reducing the temperature of the regulator.

It is preferable that a side stand that supports the vehicle body in an inclined state is provided on one side portion of the vehicle body, and the regulator is disposed below a side portion of the fuel tank at the same side as the side stand.

When the vehicle body is supported in an inclined state by the side stand, the upper wall of the regulator cover at the same side as the side stand is inclined such that the height of the upper wall is reduced toward the outer side in the vehicle width direction. As a result, water is less likely to enter the regulator cover when the vehicle is parked, so that it is possible to further prevent water from adhering to the regulator.

The straddle type vehicle may further include an exhaust pipe that leads exhaust gas discharged from the engine to the outside air. In this case, it is preferable that the regulator is disposed at a side opposite to the exhaust pipe relative to a vehicle width center.

In this aspect, since the regulator is less likely to be affected by a thermal influence of the exhaust pipe which is likely to increase in temperature, it is possible to sufficiently prevent an increase in the temperature of the regulator.

What is claimed is:

1. A straddle type vehicle comprising:
    an engine;
    a fuel tank configured to store fuel to be supplied to the engine;
    a power generator driven by the engine;
    a regulator disposed below the fuel tank and configured to adjust electric power supplied from the power generator to a battery; and
    a regulator cover that includes a side wall covering the regulator on an outer side in a vehicle width direction and an upper wall covering an upper side of the regulator,
    wherein the upper wall is formed below a side lower edge of the fuel tank to extend from an inner side to the outer side in the vehicle width direction with respect to the side lower edge, and
    wherein the upper wall has an opening formed by cutting out only a part of the upper wall from the inner side toward the outer side in the vehicle width direction, in a region on the inner side in the vehicle width direction with respect to the side lower edge.

2. The straddle type vehicle according to claim 1, wherein the upper wall includes a first portion in which the opening is formed and a second portion having a height lower than a height of the first portion.

3. The straddle type vehicle according to claim 1, wherein the upper wall is inclined such that a height of the upper wall becomes lowered toward the outer side in the vehicle width direction.

4. The straddle type vehicle according to claim 1, wherein the regulator cover includes a flange that protrudes upward from an end portion of the upper wall at the inner side in the vehicle width direction.

5. The straddle type vehicle according to claim 1, further comprising:
    an electric cable that connects the regulator and the battery; and
    a connector that connects the electric cable to a connection port provided in the regulator, wherein
    the regulator cover is formed to cover both of the regulator and the connector from the outer side in the vehicle width direction.

6. The straddle type vehicle according to claim 1, further comprising:
    a radiator that cools cooling water introduced into the engine by a heat exchange, wherein
    the regulator cover includes a front wall covering a front side of the regulator and located on a rear side of the radiator, and
    the front wall has an opening via which a pipe for the cooling water extending from the radiator is introduced.

7. The straddle type vehicle according to claim 6, wherein the regulator cover includes a rear wall covering a rear side of the regulator, and
    the rear wall has an opening at a position overlapping with the opening of the front wall as viewed in a front-rear direction.

8. The straddle type vehicle according to claim 1, wherein the engine includes a cylinder component disposed in a state where the cylinder component is exposed to outside air.

9. The straddle type vehicle according to claim 1, further comprising:
a side stand provided on one side of a vehicle body to support the vehicle body in an inclined state, wherein
the regulator is disposed on the one side which is a same side as the side stand.

10. The straddle type vehicle according to claim 1, further comprising:
an exhaust pipe that leads exhaust gas discharged from the engine to outside air and is disposed on an other side of a vehicle body, wherein
the regulator is disposed on an opposite side to the exhaust pipe with respect to a vehicle width center.

11. The straddle type vehicle according to claim 1, wherein the regulator is disposed adjacent to the engine in the vehicle width direction.

* * * * *